United States Patent [19]

Kumar

[11] Patent Number: 4,915,711
[45] Date of Patent: Apr. 10, 1990

[54] ADSORPTIVE PROCESS FOR PRODUCING TWO GAS STREAMS FROM A GAS MIXTURE

[75] Inventor: Ravi Kumar, Allentown, Pa.

[73] Assignee: Air Products and Chemicals, Inc., Allentown, Pa.

[21] Appl. No.: 354,182

[22] Filed: May 18, 1989

[51] Int. Cl.⁴ .............................................. B01D 53/04
[52] U.S. Cl. ............................................ 55/26; 55/58; 55/62; 55/68; 55/74; 55/75
[58] Field of Search .................... 55/25, 26, 58, 62, 68, 55/74, 75

[56] References Cited

U.S. PATENT DOCUMENTS

| Re. 31,014 | 8/1982 | Sircar | 55/26 |
|---|---|---|---|
| Re. 32,590 | 2/1988 | Sakuraya et al. | 55/26 |
| 3,085,379 | 4/1963 | Kiyonaga et al. | 55/62 X |
| 3,751,878 | 8/1973 | Collins | 55/58 |
| 3,788,037 | 1/1974 | Shell et al. | 55/58 |
| 3,797,201 | 3/1974 | Tamura | 55/62 |
| 4,000,900 | 1/1977 | Bingham | 55/30 |
| 4,077,779 | 3/1978 | Sircar et al. | 55/25 |
| 4,264,340 | 4/1981 | Sircar et al. | 55/25 |
| 4,415,340 | 11/1983 | Knoblauch et al. | 55/25 |
| 4,539,020 | 9/1985 | Sakuraya et al. | 55/26 |
| 4,578,089 | 3/1986 | Richter et al. | 55/26 |
| 4,592,860 | 6/1986 | Fuderer | 252/376 |
| 4,599,094 | 7/1986 | Werner et al. | 55/26 |
| 4,705,541 | 11/1987 | Sircar | 55/26 |
| 4,726,816 | 2/1988 | Fuderer | 55/26 |
| 4,770,676 | 9/1988 | Sircar et al. | 55/26 |
| 4,775,394 | 10/1988 | Yamano et al. | 55/26 |
| 4,790,858 | 12/1988 | Sircar | 55/26 |
| 4,813,980 | 3/1989 | Sircar | 55/26 |

Primary Examiner—Robert Spitzer
Attorney, Agent, or Firm—Geoffrey L. Chase; James C. Simmons; William F. Marsh

[57] ABSTRACT

An adsorptive separation process is set forth for recovery of two gas products in high recovery and high purity using adsorption, depressurization low pressure purge, evacuation and repressurization. Depressurization and purge effluents are recycled to feed and optionally pressure equalizations are performed after the adsorption and after the evacuation as well as a pressure equalization using the low pressure effluent.

15 Claims, 1 Drawing Sheet

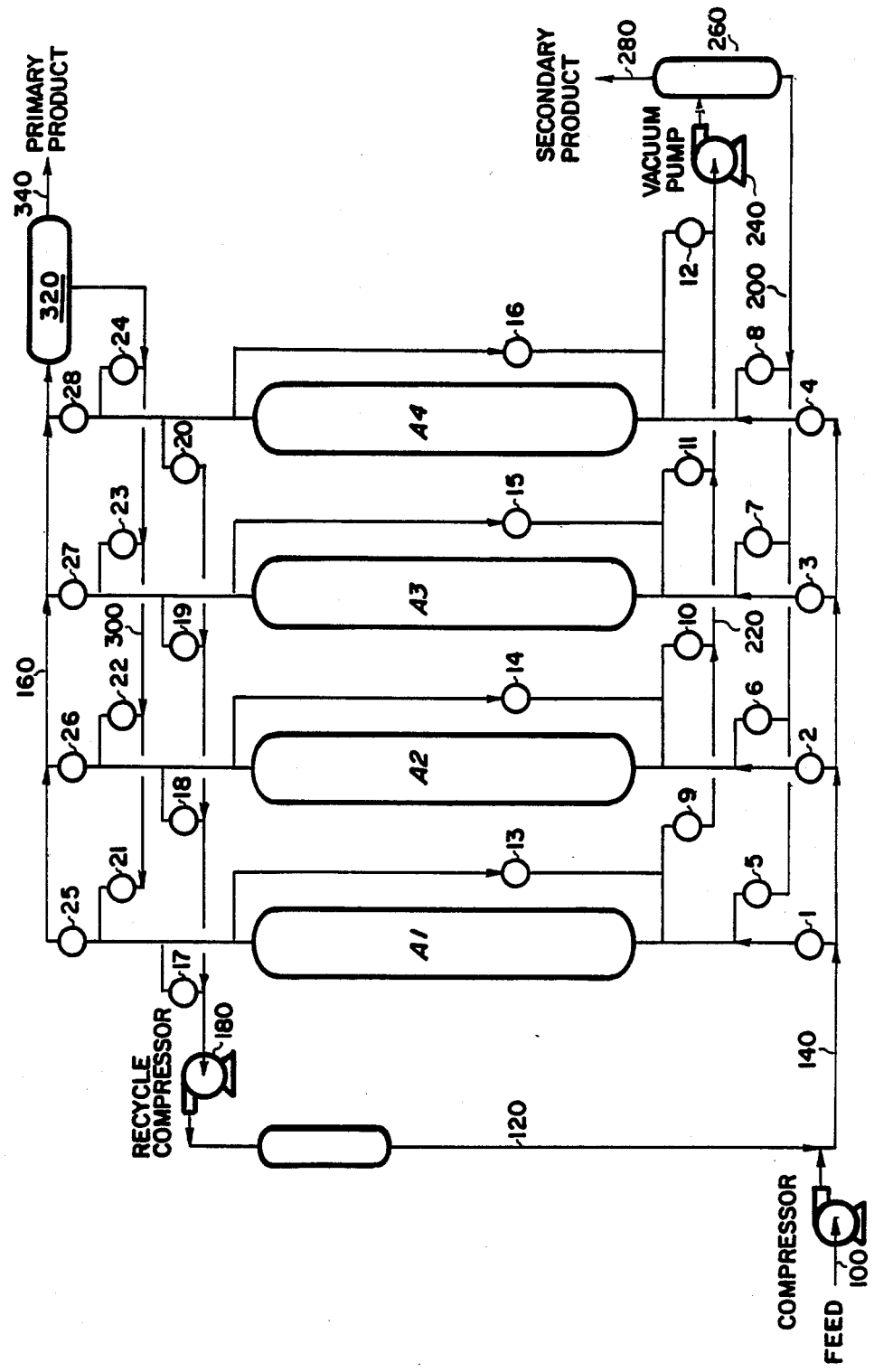

ADSORPTIVE PROCESS FOR PRODUCING TWO GAS STREAMS FROM A GAS MIXTURE

TECHNICAL FIELD

The present invention is directed to the field of pressure swing adsorption using a plurality of parallel adsorption beds to separate a more readily adsorbed gas component from a less readily adsorbed gas component in a gas mixture. More specifically, the present invention is directed to such a pressure swing adsorption using a low pressure purge and recycle of depressurization gas and purge gas effluent to feed in order to enhance recoveries.

BACKGROUND OF THE PRIOR ART

It is a common practice in the pressure swing adsorption industry to separate a mixture of gases by adsorptive techniques to produce a single high purity gas stream. However, some of the gas mixtures contain gases, two or more of which are of commercial value (e.g., $H_2/CH_4$, $CO_2/CH_4$, $CO_2/N_2/O_2$, etc.). For these mixtures, it is therefore desirable to recover two gas products. The less strongly adsorbed gas species are referred as the first gas product stream in the following discussion. The more strongly adsorbed species are referred to as the second gas product stream in the following discussion.

U.S. Pat. Nos. 3,797,201; 4,578,089; 4,599.094; and 4,539,020 (Re. 32,590) among others describe pressure swing adsorption (PSA) processes to produce a single high purity gas from a binary or ternary gas mixture. The most strongly adsorbed species is produced at ambient pressure. These PSA processes achieve either high purity or high recovery of the single product gas.

U.S. Pat. No. 4,592,860 describes a PSA process to obtain a mixture of $H_2$ and $N_2$ (Ammonia Synthesis Gas) from a multicomponent feed gas mixture obtained from a steam-methane reformer off-gas plant.

U.S. Pat. No. 3,751,878 describes a PSA process to separate methane and carbon dioxide. The process has the following four steps: adsorption at high temperature (>300° F.), high pressure carbon dioxide rinse, depressurization, and repressurization. The process is expected to be energy intensive due to the high temperature adsorption step and the need to compress the depressurized gas for the high pressure $CO_2$ rinse step.

U.S. Pat. No. 4,077,779 describes a PSA process for methane-carbon dioxide separation by the following six steps: adsorption, high pressure carbon dioxide rinse, depressurization, low pressure methane purge, evacuation, and repressurization. The process has high power consumption due to high pressure $CO_2$ rinse and low methane recovery due to the methane purge step. Carbon dioxide purity is also expected to be low.

U.S. Pat. No. 4,000,990 describes an integrated temperature swing adsorption (TSA-PSA) process to purify landfill gas. The PSA portion of the process has the following four steps to separate the binary methane-carbon dioxide gas mixture: adsorption, depressurization, evacuation, and repressurization. Methane recovery is expected to be low since most of the depressurized gas is vented to the atmosphere.

U.S. Pat. No. 4,770,676 describes two PSA processes to separate the binary methane-carbon dioxide gas mixture. The first PSA process has five steps: adsorption, high pressure $CO_2$ rinse, depressurization, evacuation, and repressurization. Product methane is of high purity (98+%) and is obtained at high recovery (~99%). Carbon dioxide product is also of high purity (~99+%) and is obtained at high recovery (98+%). However, the PSA process consumes a significant amount of power due to high pressure $CO_2$ rinse step. The second PSA process described in U.S. Pat. No. 4,770,676 has four steps: adsorption, depressurization, evacuation, and repressurization. The depressurized gas is recycled to increase the recovery of methane and carbon dioxide gas streams. This PSA process consumes less power than the five step process but results in lower methane recovery (~97+%) at high methane purity (~98+%). Also, the carbon dioxide purity (~96+%) and recovery (~97+%) are lower than obtained by the five step process.

The drawbacks of the prior art have been overcome by the present invention by the unique utilization of the various PSA process steps including a low pressure purge with more strongly adsorbed gas component and the recycle of purge effluent and depressurization gas to the feed gas stream being introduced into the process for adsorptive separation. Unlike the prior art, the present invention results in the recovery of two gas products at high purity and high recovery from a mixture of gases, the less strongly adsorbed gas species is produced at high purity, high recovery and at the elevated adsorption pressure. The more strongly adsorbed gas component is produced at high purity, high recovery and at ambient pressure conditions. The benefits and the particulars of the present invention will be set forth in greater detail below.

BRIEF SUMMARY OF THE INVENTION

The present invention is a pressure swing adsorption process for recovery of two gas products at high recovery and high purity of a feed gas stream containing said products, wherein a first gas product is a less strongly adsorbed component and a second gas product is a more strongly adsorbed component comprising the steps of: introducing a feed gas stream at elevated pressure containing said less strongly adsorbed component and said more strongly adsorbed component into one of a plurality of adsorptive beds filled with an adsorbent selective for said more strongly adsorbed component, so as to retain said more strongly adsorbed component on said adsorbent and allow the less strongly adsorbed component to pass through said bed for recovery as a first gas product at high recovery and high purity, terminating the introduction of said feed gas treatment to said bed before the more strongly adsorbed component breaks through the downstream end of said bed and depressurizing said bed to approximately ambient pressure to remove less strongly adsorbed component from said bed and recycling the depressurization effluent to the feed gas stream, passing a low pressure purge gas stream of more strongly adsorbed component through said bed to remove any residual less strongly adsorbed component from said bed and recycling the resulting effluent from the purged bed to the feed gas stream, evacuating said bed to a subambient pressure to recover more strongly adsorbed component as a second gas product at high recovery and high purity, and repressurizing said bed with less strongly adsorbed component to approximately the pressure of the feed gas stream, wherein the above steps are performed in said plurality of beds to result in a continuous process.

Preferably, the process of the present invention includes a pressure equalization after the adsorption step and before the depressurization step, wherein the bed finishing adsorption is connected with one of the parallel beds presently at a low pressure following its evacuation step.

Preferably, the process of the present invention includes a pressure equalization step after the evacuation step and before the repressurization step of the bed, wherein the evacuated bed is pressure equalized with a parallel bed presently at the elevated pressure of the feed gas stream.

Optionally, the process of the present invention may include a further pressure equalization after evacuation and before pressure equalizing with a bed at feed gas pressure, wherein the evacuated bed is pressure equalized with the effluent from one of the parallel beds presently undergoing low pressure purge.

Preferably, depressurization is performed cocurrent to the introduction of the feed gas stream.

Preferably, the low pressure purge is performed cocurrent to introduction of the feed gas stream.

Preferably, the evacuation is performed countercurrent to the introduction of the feed gas stream.

Preferably, the repressurization is performed countercurrent to the introduction of the feed gas stream.

Alternatively, the evacuation is performed both cocurrently and countercurrently to the feed gas stream simultaneously.

Preferably, the elevated pressure of the feed gas stream is in the range of approximately 30 to 500 psia.

Preferably, the depressurization is conducted down to a pressure of approximately 15 psia.

Preferably, the evacuation is conducted down to a pressure in the range of approximately 40 to 200 torr.

Preferably, the less strongly adsorbed components and the more strong adsorbed components respectively, are selected from the group consisting of hydrogen/methane, methane/carbon dioxide, nitrogen/carbon dioxide and nitrogen/oxygen.

Preferably, the adsorbent is selected from the group consisting of various zeolites, activated carbon, activated aluminas and silica gels.

Preferably, the more strongly adsorbed component and the less strongly adsorbed component are recovered in excess of 98% recovery and in excess of 98% purity.

BRIEF DESCRIPTION OF THE DRAWING

The drawing is a schematic illustration of a four bed embodiment of the present invention.

DETAILED DESCRIPTION OF THE INVENTION

The present invention is an adiabatic pressure swing adsorption (PSA) process to produce two high purity gas streams at high recovery from a mixture of gases. The suggested process is more efficient than any of the known prior art PSA processes. It consists of the following five steps.
(Option #1):
1. Adsorption (A)
2. Depressurization (DP)
3. Low Pressure Purge (LPP)
4. Evacuation (Ev)
5. Repressurization (RP)
Other cycle options are:
Option #2:

1. Adsorption
2. Pressure Equalization (PE)
3. Depressurization
4. Low Pressure Purge
5. Evacuation
6. Pressure Equalization (PE)
7. Repressurization
Option #3:
1. Adsorption
2. Pressure Equalization
3. Depressurization
4. Low Pressure Purge
5. Evacuation
6. Low Pressure Purge Pressure Equalization (LPPE)
7. Pressure Equalization
8. Repressurization These steps are carried out in two or more adsorbent beds with appropriate gas storage tanks. The process step sequence using four adsorbent beds for option #1 and option #2 is listed in Tables 1 and 2, respectively. A six bed and a five bed process step sequence for option #3 is listed in Tables 3 and 4, respectively. Other variations can be made to these basic steps. An example of such a variation is the introduction of a blowdown step after the low pressure purge step in case the low pressure purge step is carried out at pressure higher than ambient pressure.

The process cycle for option #1 will now be described in detail:

1. Adsorption Step, which consists of:
   (a) Flowing the feed gas stream at a pressure (P) $\sim 30$–500 psia and temperature (T) $\sim 40°$–$150°$ F. through a bed packed with an adsorbent capable of selectively adsorbing the desired more strongly adsorbed component product from the feed gas stream as second gas product.
   (b) Withdrawing an effluent stream of less strongly adsorbed component from the downstream end of the bed which is the high purity first gas product from the bed on the adsorption step.
   (c) Continuing steps 1(a) and 1(b) for a predetermined cycle time or until the concentration of the second gas product in the effluent stream reaches a preset limit. The bed is now called "spent" because it has exhausted its capacity for adsorbing the second gas product from the feed gas stream.

2. Depressurization Step, which consists of:
   (a) Discontinuing the feed gas stream flow through the "spent" bed and transferring the feed to another parallel PSA bed.
   (b) Reducing the pressure in the spent bed to $\sim 15$ psia by venting the gas in the bed in direction either opposite to or the same as the feed gas stream flow.
   (c) Raising the pressure of all the depressurized gas from step 2(b) to the same level as the feed gas stream pressure in step 1(a) by a compressor.
   (d) Mixing the gas from 2(c) with the fresh feed gas stream and feeding the mixed gas to the bed presently on step 1(a).

3. Low Pressure Purge Step, which consists of:
   (a) Flowing the high purity second gas product stream at P $\sim 15$ psia through the depressurized bed in a direction either countercurrent or cocurrent to the feed gas stream flow. The second gas product stream used as influent for this step is obtained from the PSA bed on step 4 of this cycle.

(b) Withdrawing the effluent stream and raising its pressure to the same level as the feed gas stream pressure in step 1(a) by a compressor.

(c) Mixing the gas step 3(b) with the fresh feed gas stream and feeding the mixed gas to the bed presently on step 1(a).

(d) Continuing steps 3(a) and 3(b) for a predetermined cycle time or until the concentration of the second gas product in the effluent stream reaches a preset limit. The bed is now called "saturated."

4. Evacuation Step, which consists of:
Either—
(a) Lowering the pressure of the saturated bed from P $\sim$15 psia to P $\sim$40–200 torr by evacuating the gas from the feed end of the bed.

(b) Storing the evacuated gas, which is the second gas product stream at high purity and ambient pressure for further use.

(c) Part of this gas stream is used for low pressure purge in step 3(a).
Or—
(a) Lowering the pressure of the saturated bed from P $\sim$15 psia to P $\sim$40–200 torr by simultaneously evacuating the gas from both the feed and the product ends of the bed.

(b) Storing the evacuated gas, which is the second gas product stream at high purity and ambient pressure for further use.

(c) Part of this gas stream is used for low pressure purge in step 3(a).

5. Repressurization Step, which consists of: (a) Discontinuing the pressure reduction of the bed. The bed is now called "regenerated" because its capacity for adsorbing the more strongly adsorbed gas component has been restored.

(b) Raising pressure in the regenerated bed from evacuation level (40–200 torr) to adsorption level (30–500 psia) by connecting the product end of the regenerated bed with the product end of the bed on step 1(b).

(c) Discontinuing the above step when the pressure in the regenerated bed has reached the desired level.

This bed is now ready to undergo a new cycle starting from step 1 (a).

TABLE 1

PROCESS STEPS FOR THE CYCLE (OPTION #1)

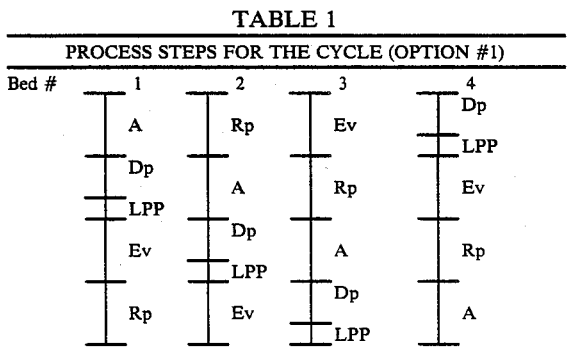

A = Adsorption
Dp = Depressurization
Ev = Evacuation
LPP = Low pressure purge in the same direction as feed flow by the more strongly adsorbed component.
Rp = Repressurization Process cycle for option #2 will now be described in detail:

1. Adsorption Step, which consists of:
(a) Flowing the gas mixture at P $\sim$30–500 psia and T $\sim$40°–150° F. through a bed packed with an adsorbent capable of selectively adsorbing the more strongly adsorbed component from the feed gas stream as a second gas product.

(b) Withdrawing an effluent stream which is the less strongly adsorbed component from the bed on the adsorption step as a first gas product.

(c) Continuing steps (a) and (b) for a predetermined cycle time or until the concentration of the second gas product in the effluent stream reaches a preset limit. The bed is now called "spent" because it has exhausted its capacity for adsorbing the second gas product from the feed gas stream mixture.

2. Pressure Equalization Step, which consists of:
(a) Discontinuing the feed flow through the "spent" bed and transferring the feed to another PSA bed.

(b) Reducing the pressure in the "spent" PSA bed from the adsorption pressure level to some "intermediate level" (P $\sim$20–300 psia) by connecting the feed or the product end of the PSA bed with the feed or the product end of another PSA bed on step 6 of its cycle. The "intermediate level" will be approximately halfway between the evacuation pressure of the bed undergoing step 6 and the adsorption pressure of the bed just finishing step 1.

(c) Discontinuing the above step when the pressure in the connected PSA beds is equal and has reached the same "intermediate level."

3. Depressurization Step, which consists of:
(a) Further reducing the pressure in the spent bed from the "intermediate level" to $\sim$15 psia by venting the gas in direction either opposite to or same as the feed gas stream flow.

(b) Raising pressure of all the depressurized gas from step 3(a) to the same level as the feed gas stream pressure in step 1 (a) by a compressor.

(c) Mixing the gas from step 3(b) with the fresh feed gas stream and feeding the mixed gas to the bed on step 1(a).

4. Low Pressure Purge Step, which consists of:
(a) Flowing the high purity second gas product stream at P $\sim$15 psia through the depressurized bed in a direction either countercurrent or cocurrent to the feed flow. The second gas product stream used as influent for this step is obtained from the PSA bed on step 5 of its cycle.

(b) Withdrawing the effluent stream and raising its pressure to the same level as the feed gas stream pressure in step 1(a) by a compressor.

(c) Mixing the gas from step 4(b) with the fresh feed gas stream and feeding the mixed gas to the bed on step 1(a).

(d) Continuing steps 4(a) and 4(b) for a predetermined cycle time or until the concentration of the second gas product in the effluent stream reaches a preset limit. The bed is now called "saturated."

5. Evacuation Step, which consists of:
Either—
(a) Lowering the pressure of the saturated bed from P $\sim$15 psia to P $\sim$40–200 torr by evacuating the gas in the bed from the feed end of the bed.

(b) Storing the evacuated gas, which is the second gas product stream at high purity and ambient pressure for further use.

(c) Part of this gas stream is used for low pressure purge in step 4(a).
Or—

(a) Lowering the pressure of the saturated bed from P ~15 psia to P ~40-200 torr by simultaneously evacuating the gas from both the feed and the product ends of the bed.

(b) Storing the evacuated gas, which is the second gas product stream at high purity and ambient pressure for further use.

(c) Part of this gas stream is used for low pressure purge in step 4(a).

6. Pressure Equalization Step, which consists of:

(a) Discontinuing the pressure reduction of the bed. The bed is now called "regenerated" because its capacity for adsorbing the more strongly adsorbed gas component has been restored.

(b) Raising the pressure in the regenerated bed from evacuation level (40-200 torr) to some "intermediate level" (P ~20-300 psia) by connecting the feed or the product end of the regenerated bed with the feed or the product end of another PSA bed which is on step 2 of its cycle.

(c) Discontinuing the above step when the pressure in the connected PSA beds is equal and has reached the same "intermediate level."

7. Represssurization Step, which consists of: (a) Further raising the pressure in the regenerated bed from the "intermediate level" to adsorption level (30-500 psia) by connecting the product end of the regenerated bed with product end of the bed on step 1(b).

(b) Discontinuing the above step when pressure in the regenerated bed has reached the desired level.

This bed is now ready to undergo a new cycle starting from step 1(a).

TABLE 2

PROCESS STEPS FOR THE CYCLE (OPTION #2)

| Bed # | 1 | 2 | 3 | 4 |
|---|---|---|---|---|
| | A | PE Rp | Ev | PE Dp LPP |
| | PE Dp LPP | A | PE Rp | Ev |
| | Ev | PE Dp LPP | A | PE Rp |
| | PE Rp | Ev | PE Dp LPP | A |

A = Adsorption
Dp = Depressurization
Ev = Evacuation
LPP = Low pressure purge in the same direction as feed flow by the more strongly adsorbed component.
PE = Pressure Equalization
Rp = Repressurization Process cycle for option #3 will now be described in detail:

1. Adsorption Step, which consists of:

(a) Flowing the feed gas stream at P ~30-500 psia and T ~40°-150° F. through a bed packed with an adsorbent capable of selectively adsorbing the more strongly adsorbed component from the feed gas stream as second gas product.

(b) Withdrawing an effluent stream which is the less strongly adsorbed component from the bed on the adsorption step as the first gas product.

(c) Continuing steps 1(a) and 1(b) for a predetermined cycle time or until the concentration of the second gas product in the effluent stream reaches a preset limit. The bed is now called "spent" because it has exhausted its capacity for adsorbing the second gas product from the feed gas stream.

2. Pressure Equalization Step, which consists of:

(a) Discontinuing the feed flow through the "spent" bed and transferring the feed to another PSA bed.

(b) Reducing the pressure in the "spent" PSA bed from the adsorption pressure level to some "intermediate level" (P ~25-300 psia) by connecting the feed or the product end of the PSA bed with the feed or the product end of another PSA bed undergoing step 7 of the cycle. The intermediate pressure is approximately halfway between the adsorption pressure of the bed going off step 1 and the pressure of the bed finishing step 6.

(c) Discontinuing the above step when the pressure in the connected PSA beds is equal and has reached the same "intermediate level."

3. Depressurization Step, which consists of:

(a) Further reducing the pressure in the spent bed from the "intermediate level" to ~15 psia by venting the gas in the bed in a direction either countercurrent or cocurrent to the feed gas stream flow.

(b) Raising the pressure of all the depressurized gas from step 3(a) to the same level as the feed gas stream pressure in step 1(a) by a compressor.

(c) Mixing the gas from step 3(b) with the fresh feed gas stream and feeding the mixed gas to the bed on step 1(a).

4. Low Pressure Purge Step, which consists of:

(a) Flowing the high purity second product at P ~15 psia through the depressurized bed in direction either countercurrent or cocurrent to the feed flow. The second gas product stream used as influent for this step is obtained from the PSA bed undergoing step 5 of the cycle.

(b) Withdrawing the effluent stream from the bed on step 4(a) and introducing it into the PSA bed undergoing step 6 of the cycle.

(c) Continuing step 4(b) until the pressure in both of the connected PSA beds is the same ("lower pressure level" of approximately 15 psia).

(d) Further withdrawing the effluent stream and raising its pressure to the same level as the feed gas stream pressure in step 1(a) by a compressor.

(e) Mixing the gas from step 4(d) with the fresh feed gas stream and feeding the mixed gas to the bed on step 1(a).

(f) Continuing step 4(a) for a predetermined cycle time or until the concentration of the second gas product in the effluent stream reaches a preset limit. The bed is now called "saturated."

5. Evacuation Step, which consists of:

(a) Lowering the pressure of the saturated bed from P ~15 psia to P ~40-200 torr by evacuating the gas from the feed end of the bed.

(b) Storing the evacuated gas, which is the second gas product stream, at high purity and ambient pressure for further use.

(c) Part of this gas stream is used for low pressure purge in step 4(a).

Or—

(a) Lowering the pressure of the saturated bed from P ~15 psia to P ~40-200 torr by simultaneously evacuating the gas from both the feed and the product ends of the bed.

(b) Storing the evacuated gas, which is the second gas product stream, at high purity and ambient pressure for further use.

(c) Part of this gas stream is used for low pressure purge in step 4(a).

6. Low Pressure Purge Pressure Equalization Step, which consists of:

(a) Discontinuing the pressure reduction of the bed. The bed is now called "regenerated" because its capacity for adsorbing the more strongly adsorbed gas component has been restored.

(b) Raising the pressure in this PSA bed from evacuation level (40–200 torr) to the "lower pressure level" (P ~ 15 psia) by connecting the feed or the product end of this PSA bed with the effluent end of another PSA bed undergoing step 4 of the cycle.

(c) Discontinuing the above step when the pressure in the connected PSA beds is equal and has reached the same "lower pressure level."

7. Pressure Equalization Step, which consists of:

(a) Further raising the pressure in the regenerated bed from lower pressure level to the "intermediate level" (P ~ 25–300 psia) by connecting the feed or the product end of the regenerated bed with the feed or the product end of another PSA bed which is undergoing step 2 of the cycle.

(b) Discontinuing the above step when the pressure in the connected PSA beds is equal and has reached the same "intermediate mediate level."

8. Repressurization Step, which consists of:

(a) Further raising the pressure in the regenerated bed from the "intermediate level" to adsorption level (30–500 psia) by connecting the product end of the regenerated bed with the product end of the bed on step 1(b).

(b) Discontinuing the above step when pressure in the regenerated bed has reached the desired level.

This bed is now ready to undergo a new cycle starting from step 1(a).

TABLE 3

PROCESS STEPS FOR THE CYCLE (OPTION #3) (SIX BEDS)

| Bed # | 1 | 2 | 3 | 4 | 5 | 6 |
|---|---|---|---|---|---|---|
| | A | PE Rp | LPPE | Ev | LPP | PE Dp |
| | PE Dp | A | PE Rp | LPPE | Ev | LPP |
| | LPP | PE Dp | A | PE Rp | LPPE | Ev |
| | Ev | LPP | PE Dp | A | PE Rp | LPPE |
| | LPPE | Ev | LPP | PE Dp | A | PE Rp |
| | PE Rp | LPPE | Ev | LPP | PE Dp | A |

A = Adsorption
Dp = Depressurization
Ev = Evacuation
LPP = Low pressure purge in the same direction as feed flow by the more strongly adsorbed component.
LPPE = Pressure Equalization by low pressure purge (LPP) effluent
PE = Pressure Equalization
Rp = Repressurization

TABLE 4

PROCESS STEPS FOR THE CYCLE (OPTION #3) (FIVE BEDS)

| Bed # | 1 | 2 | 3 | 4 | 5 |
|---|---|---|---|---|---|
| | A | PE RP | EV | I | PE DP |
| | | | LPPE | | LDP |
| | PE DP | A | PE RP | EV | I |
| | LPP | | | LPPE | |
| | I | PE DP | A | PE RP | EV |
| | | LPP | | | LPPE |
| | EV | I | PE DP | A | PE RP |
| | LPPE | | LPP | | |
| | PE RP | EV | I | PE DP | A |
| | | LPPE | | LPP | |

A = Adsorption
Dp = Depressurization
Ev = Evacuation
I = Idle
LPP = Low pressure purge in the same direction as feed flow by the more strongly adsorbed component.
LPPE = Pressure Equalization by low pressure purge (LPP) effluent
PE = Pressure Equalization
Rp = Repressurization

DETAILED DESCRIPTION OF THE SUGGESTED CYCLE

Flow schematic and hardware will be somewhat different for each of the process options of the process of the present invention. The drawing depicts a schematic for option #1 of the present invention with cocurrent depressurization, concurrent low pressure purge and evacuation from both the feed and the product ends of the column. Table 5 outlines the corresponding valve sequence for a typical cycle time. Detailed description of the cycle at typical operating conditions for the process option described in the drawing and Table 5 is given below:

A fresh feed gas stream 100 at P ~100 psia and T ~70° F. is mixed with the recycle stream 120 at similar pressure and temperature. The mixed gas 140 is fed to one of the PSA beds, (A1, A2, A3 or A4) let us say bed A1 via open valve 1. This bed has been previously pressurized to adsorption pressure, P ~100 psia. First gas product comprising the less strongly adsorbed component is withdrawn from bed A1 via open valve 25 at P ~100 psia in line 160. A part of the first gas product from vessel 320 is removed as a product for export in line 340 and the remainder is recycled in line 300 as tivity, (ii) high working capacity, (iii) fast kinetics, and (iv) low heat of adsorption. Typical examples are zeolites, activated carbons, activated aluminas, or silica gels. Other desired properties of the adsorbents are (i) high crush strength. (ii) high attrition resistance, (iii) large bulk density. (iv) low interparticle void, (v) high heat capacity, (vi) large thermal conductivity, and (vii) small particle size. Pressure drop through the adsorbent beds during adsorption, purge, and evacuation steps are also important properties for adsorbent selection. Exemplary adsorbents for specific gas separations are 13X zeolite for $CH_4/CO_2$ and $N_2/CO_2$ separations; an activated carbon for $H_2/CH_4$ separations; and CaX zeolite for $O_2/N_2$ separations.

TABLE 5

| Time (Minutes) | Valve Sequence for the Suggested Process Valve # | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 0–3 | O | | | | | | | | | | | O | | | O | | | | | O | O | | | O | | | | |
| 3–5 | O | | | | | O | | | | | O | | | O | | | | | | O | O | | | O | | | | |
| 5–8 | | O | | | | | | | | | | | | | | O | O | | | | | O | | | O | | | |
| 8–10 | | O | | O | | | | | | | | | | | | O | O | | | | | O | | | O | | | |
| 10–13 | | | O | | | | | | O | | | | | O | | | | O | | | | | O | | | O | | |
| 13–15 | | | O | | O | | | | O | | | | | O | | | | O | | | | | O | | | O | | |
| 15–18 | | | | O | | | | | | | O | | | O | | | | | O | O | | | | | | | | O |
| 18–20 | | | | O | | O | | | | | O | | | O | | | | | O | O | | | | | | | | O |

O — valve open, otherwise closed repressurization gas. The adsorption step is continued until a fixed time or until the effluent concentration from bed A1 has reached a predetermined level. At the end of the adsorption step, the feed gas stream is directed to the second bed, let us say bed A2. Bed A1 is now depressurized to P ~15 psia cocurrently to the feed gas stream flow via open valve 17. The desorbed gas from bed A1 is recompressed to adsorption pressure, P ~100 psia by the recycle compressor 180 and is mixed with the fresh feed gas stream before entering bed A2, which is at the adsorption step. At the end of the depressurization step, the more strongly adsorbed component is used to purge bed A1 cocurrent to the feed gas stream flow via open valves 5 and 17 and line 200. The effluent from this low pressure purge step is recompressed to adsorption pressure. P ~100 psia, by the recycle compressor 180 and is mixed with the fresh feed gas stream before entering bed A2, which is at the adsorption step.

Following the low pressure purge step, bed A1 undergoes pressure reduction by evacuation via open valves 9 and 13, as well as line 220. The pressure in bed A1 is reduced from P ~15 psia at the end of the low pressure purge step to P ~100 mmHg at the end of the evacuation step by means of vacuum pump 240. The evacuated gas is the more strongly adsorbed component of the gas mixture and constitutes the second gas product stream from the PSA system. It is at P ~1 atmosphere (atm), and part of this gas is used for the low pressure purge step while a part is used as second gas product removed from vessel 260 in line 280. Bed A1 is now pressurized via open valve 21 and line 300 by the first gas product stream from evacuation pressure up to the adsorption pressure, P ~100 psia. Bed A1 is now ready to undergo another cycle starting from the adsorption step.

Any adsorbent which can selectively adsorb the secondary gas product from the first gas product can be used. The key adsorptive properties are (i) high selec-

AN EXAMPLE

A mixture of carbon dioxide (~44%) and methane (~56%) was separated in a lab column (~8'×2") using the above described cycle. A commercially available zeolite 13X was used as the adsorbent. A first product (methane) gas stream at 98.6% purity and 99.8% recovery was obtained. A second product (carbon dioxide) gas stream at 99.7% purity and 98.2% recovery was obtained. The first product stream was at P ~105 psia and the second product stream was at P ~15 psia.

Table 6 compares the performance of the present invention against the performance of the four and five step cycles described in U.S. Pat. No. 4,770,676 for $CH_4/CO_2$ separation under identical operating conditions. The cycle of the present invention:

- as compared against the five step prior art cycle, requires less power (~8% smaller vacuum pump and ~47% less recycle flow), results in somewhat higher methane recovery (99.8% vs. 99.0%), and higher carbon dioxide purity (99.7% vs. 99.5%), and
- as compared against the four step prior art cycle, results in significantly higher methane recovery (99.8% vs. 97.8%), higher $CO_2$ recovery (98.2% vs. 97.9%), and higher $CO_2$ purity (99.7% vs. 96.9%) and, requires somewhat more power (~12% larger vacuum pump and ~21% more recycle flow).

TABLE 6

| Comparative Process Performance Feed: 44% $CO_2$ + 56% $CH_4$ | | | |
|---|---|---|---|
| | Five Step Cycle* | Four Step Cycle* | Present Invention |
| Methane: | | | |
| Recovery | 99.0 | 97.8 | 99.8 |

TABLE 6-continued

Comparative Process Performance
Feed: 44% $CO_2$ + 56% $CH_4$

|  | Five Step Cycle* | Four Step Cycle* | Present Invention |
|---|---|---|---|
| Purity Carbon Dioxide | 98.6 | 98.6 | 98.6 |
| Recovery | ~98.1 | ~97.9 | ~98.2 |
| Purity | 99.5 | 96.9 | 99.7 |
| Vacuum Pump (ACFM) | 6242 | 5146 | 5756 |
| Recycle Stream (lb mole/hr) | 227.4 | 99.5 | 120.8 |

*PSA cycles described in U.S. Pat. No. 4,770,676

The present invention employs a low pressure purge step by the more strongly adsorbed component following the depressurization step. This step coupled with the recycle of the depressurization and the low pressure purge effluent streams results in superior performance of this process over any other PSA processes described in the prior art. It has been ascertained that if the selectivity* of the most strongly adsorbed species is higher than ~20. than the adsorbent bed after the depressurization step is nearly completely saturated with the most strongly adsorbed species (~97% $CO_2$ for the illustrated example). It has also been ascertained that since the bed at the end of the depressurization step is nearly saturated with the more strongly adsorbed component, the quantity of the low pressure purge gas required to completely saturate the bed and therefore obtain a high purity second gas product stream during the evacuation step is relatively small. The low pressure purging is also more efficient than the high pressure rinse (U.S. Pat. No. 4,077,779) since selectivity increases as the operating pressure is decreased. These two factors result in efficient use of the more strongly adsorbed component as a purge gas. Recycling the low pressure purge and depressurization gas effluent to the feed gas stream results in high recovery of both the gas product streams. The pressure equalization steps reduce the power and size of the recycle compressor.

*Selectivity 1/2 =

$$\frac{\text{1-Solid Phase Capacity}}{\text{1-Gas Phase Mole Fraction}} * \frac{\text{2-Gas Phase Mole Fraction}}{\text{2-Solid Phase Capacity}}$$

The present invention has been set forth with regard to several specific embodiments, however, the full scope of the present invention should be ascertained from the claims which follow.

I claim:

1. A pressure swing adsorption process for recovery of two gas products at high recovery and high purity from a feed gas stream containing said products wherein a first gas product is a less strongly adsorbed component and a second gas product is a more strongly adsorbed component, comprising:
   (a) introducing a feed gas stream at elevated pressure containing said less strongly adsorbed component and said more strongly adsorbed component into one of a plurality of parallel adsorptive beds filled with an adsorbent selective for said more strongly adsorbed component, so as to retain said more strongly adsorbed component on said adsorbent and allow the less strongly adsorbed component to pass through said bed for recovery as said first gas product at high recovery and high purity;
   (b) terminating the introduction of said feed gas stream into said bed before said more strongly adsorbed component breaks through the downstream end of said bed and depressurizing said bed to approximately ambient pressure to remove less strongly adsorbed component from said bed and recycling the resulting depressurization effluent to said feed gas stream;
   (c) passing a low pressure purge gas stream of more strongly adsorbed component through said bed to remove any residual less strongly adsorbed component from said bed and recycling the resulting effluent from said purged bed to the feed gas stream;
   (d) evacuating said bed to a subambient pressure to recover more strongly adsorbed component as said second gas product at high recovery and high purity, and
   (e) repressurizing said bed with less strongly adsorbed component to approximately the pressure of the feed gas stream, wherein the steps (a) through (e) are performed on said plurality of beds to result in a continuous process.

2. The process of claim 1 wherein after the absorption step (a) and before the depressurization step (b), said bed is pressure equalized with one of said parallel beds presently at a low pressure following its evacuation step.

3. The process of claim 1 wherein after the evacuation step (d) and before the repressurization step (e) said bed is pressure equalized with one of said parallel beds presently at the elevated pressure of said feed gas stream.

4. The process of claim 3 wherein after the evacuation step (d) and before the pressure equalization step, pressure equalizing said bed with one of said beds presently undergoing the low pressure purge step (c).

5. The process of claim 1 wherein depressurization is performed co-current to introduction of said feed gas stream.

6. The process of claim 1 wherein the low pressure purge is performed co-current to introduction of said feed gas stream.

7. The process of claim 1 wherein the evacuation is performed countercurrent to the introduction of said feed gas stream.

8. The process of claim 1 wherein the repressurization is performed countercurrent to the introduction of said feed gas stream.

9. The process of claim 1 wherein the evacuation is performed co-currently and countercurrently to the introduction of said feed gas stream simultaneously.

10. The process of claim 1 wherein the elevated pressure of said feed gas stream is in the range of approximately 30 to 500 psia.

11. The process of claim 1 wherein the depressurization is conducted down to a pressure of approximately 15 psia.

12. The process of claim 1 wherein the evacuation is conducted down to a pressure in the range of approximately 40 to 200 torr.

13. The process of claim 1 wherein said less strongly adsorbed components and said more strongly adsorbed components, respectively, are selected from the group consisting of $H_2/CH_4$, $CH_4/CO_2$, $N_2/CO_2$ and $N_2/O_2$.

14. The process of claim 1 wherein the adsorbent is selected from the group consisting of zeolites, activated carbon, activated aluminas and silica gels.

15. The process of claim 1 wherein both said more strongly adsorbed component and said less strongly adsorbed component are recovered in excess of 98% recovery and in excess of 98% purity.

* * * * *